United States Patent
Hackert et al.

(10) Patent No.: US 8,186,449 B2
(45) Date of Patent: May 29, 2012

(54) AGRICULTURAL IMPLEMENT WALKING BEAM ASSEMBLY

(75) Inventors: Ryan A. Hackert, Oskaloosa, IA (US); Jarrod R. Ruckle, Bondurant, IA (US); Shawn J. Becker, Ankeny, IA (US); Roderick A. Healy, West Des Moines, IA (US); Garrett L. Goins, Ankeny, IA (US)

(73) Assignee: Deere & Company, Moline, IL (US)

( * ) Notice: Subject to any disclaimer, the term of this patent is extended or adjusted under 35 U.S.C. 154(b) by 294 days.

(21) Appl. No.: 12/571,829

(22) Filed: Oct. 1, 2009

(65) Prior Publication Data

US 2011/0079405 A1 Apr. 7, 2011

(51) Int. Cl.
*A01B 69/00* (2006.01)
(52) U.S. Cl. .. 172/288; 172/311; 172/669; 280/124.111
(58) Field of Classification Search .................. 172/310, 172/311, 456, 669, 776, 278, 292, 383, 384, 172/288; 280/6.154–6.156, 124.11, 124.111, 280/124.112, 124.116, 43, 43.13, 43.18; 180/24.13, 8.2
See application file for complete search history.

(56) References Cited

U.S. PATENT DOCUMENTS

| | | | | |
|---|---|---|---|---|
| 1,930,619 A | * | 10/1933 | Wouter | 280/124.11 |
| 2,208,599 A | * | 7/1940 | Ronning | 280/124.119 |
| 2,208,600 A | * | 7/1940 | Ronning | 280/124.119 |
| 3,262,715 A | * | 7/1966 | Abbott | 280/124.114 |
| 3,825,088 A | | 7/1974 | Copeland | |
| 4,139,065 A | | 2/1979 | Lewison | |
| 4,166,511 A | | 9/1979 | Stedman | |
| 4,430,952 A | | 2/1984 | Murray | |
| 4,483,406 A | | 11/1984 | Smith | |
| 4,519,460 A | * | 5/1985 | Gust | 172/176 |
| 4,534,575 A | * | 8/1985 | Grove et al. | 280/124.136 |
| 4,594,951 A | * | 6/1986 | Grataloup | 111/195 |
| 4,964,480 A | * | 10/1990 | Kopczynski | 180/22 |
| 4,974,684 A | * | 12/1990 | Stevens | 172/311 |
| 5,139,314 A | | 8/1992 | Deckler | |
| 5,235,922 A | | 8/1993 | Deckler | |
| 5,437,467 A | * | 8/1995 | Patin | 280/6.154 |
| 5,871,218 A | * | 2/1999 | Lepage et al. | 280/33.992 |
| 6,279,931 B1 | * | 8/2001 | Kopczynski | 280/124.111 |
| 6,796,568 B2 | * | 9/2004 | Martis et al. | 280/124.111 |

OTHER PUBLICATIONS

John Deere; Frame Configuration 2510 H Internet Brochure; Last Updated Aug. 11, 2009; U.S.; 3 pages.
John Deere; Wheel Modules John Deere 2510 H Internet Brochure; Last Updated Jul. 28, 2009; U.S.; 1 page.

* cited by examiner

*Primary Examiner* — Robert Pezzuto
*Assistant Examiner* — Matthew D Troutman

(57) ABSTRACT

An implement wheel assembly includes two individual wheel arms tied together by a linkage that pivots about a fore-and-aft extending axis at a location above the wheels and generally above the plane of the implement frame. The linkage constrains the wheel arms to pivot in opposite vertical directions as the implement moves over irregular ground surfaces to improve weight distribution on the wheels. Spring structure may be interposed between the ends of a pivoting linkage and the individual wheel arms to lower frame impact forces. The structure allows two wheels to be placed side-by-side with their axes generally aligned and reduces under-frame hardware to improve crop and soil and trash flow.

19 Claims, 5 Drawing Sheets

US 8,186,449 B2

AGRICULTURAL IMPLEMENT WALKING BEAM ASSEMBLY

FIELD OF THE INVENTION

The present invention relates generally to wheel assemblies for ground working implements and, more specifically, to such assemblies which include a walking beam support arrangement.

BACKGROUND OF THE INVENTION

Implement wheel assemblies often include a walking beam arrangement to allow relative vertical movement of two fore-and-aft offset wheels as the implement moves over irregular ground surfaces. Opposite ends of a fore-and-aft extending walking beam support the wheels, and the central portion of the beam is pivotally connected for rocking about a pivot location in line with the wheels to maintain a generally equal load on each of the wheels. Such an arrangement, although adequate for many implement configurations, can present space problems for some applications such as those requiring high crop clearance tires for row crop applications or for implements which are used to sidedress material. Currently, space-consuming larger diameter tires provide the necessary ground offset. Also, as the implements increase in size, the support structure for the increased weight and loads also has to be made larger and becomes more expensive.

SUMMARY OF THE INVENTION

To provide proper weight transfer without sacrificing crop clearance for row crop applications, two individual wheel arms are tied together by a linkage that pivots about a fore-and-aft extending axis at a location above the wheels and generally in line with a portion of the implement frame. The linkage assures a balance of weight transfer to the two transversely spaced wheels so that a single wheel is not overloaded. Spring members may be interposed between the ends of the pivoting linkage and the individual wheel arms to lower frame impact forces and reduce the size and weight of the frame structure. The structure allows two wheels to be placed side-by-side in weight-sharing relationship. An above-frame mounting arrangement reduces under-frame hardware and crop and soil flow impedance. Tools such as fertilizer openers may be advantageously arranged under the frame forwardly of the wheels, and the wheel support arrangement facilitates sufficient under-frame clearance for sidedressing fertilizer in tall crops.

These and other objects, features and advantages of the present invention will become apparent from the description which follows taken in view of the drawings.

DESCRIPTION OF THE PREFERRED EMBODIMENT

Figure 1:
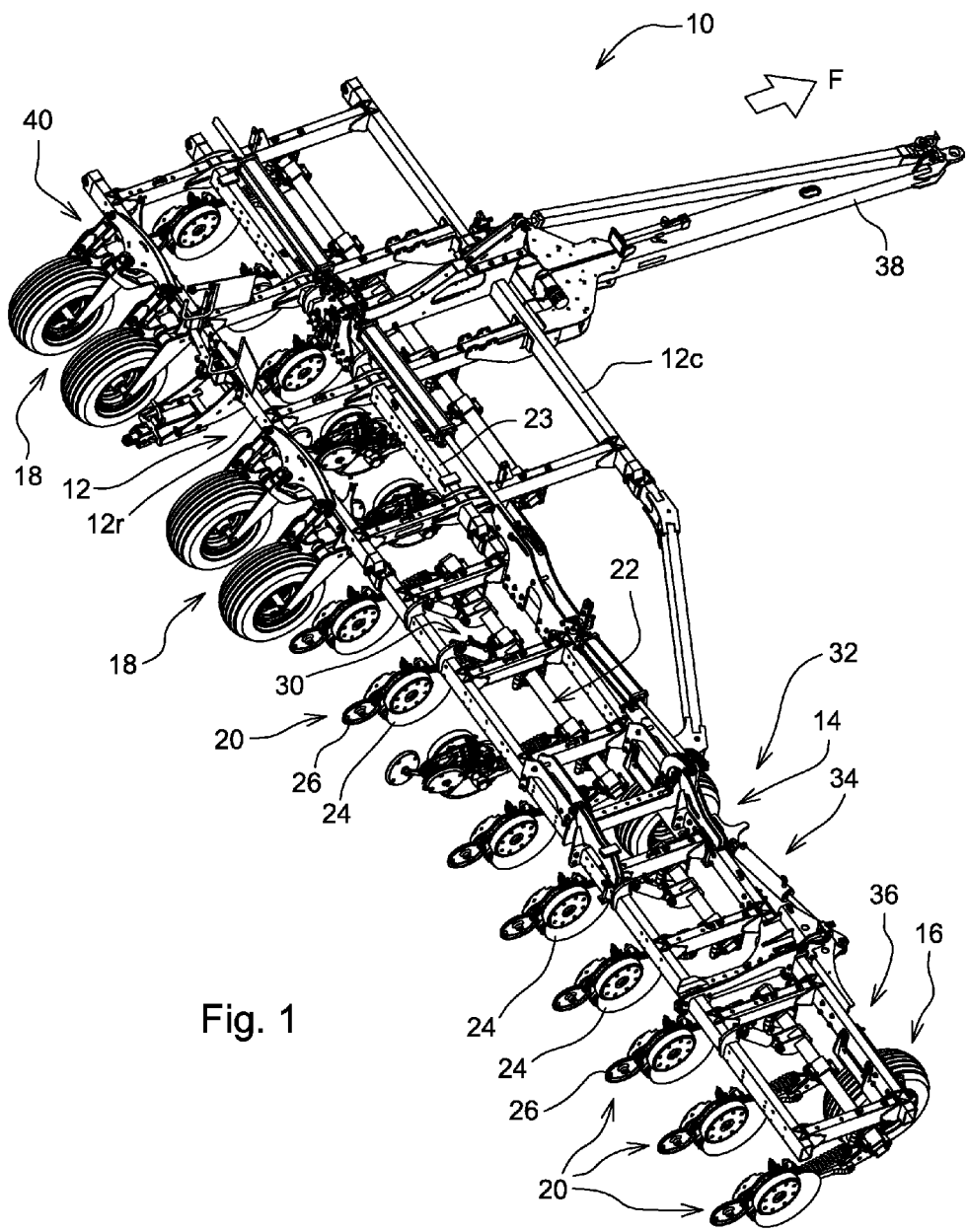
FIG. 1 is a rear perspective view of a portion of an agricultural implement with a main frame supported above the ground by wheel assemblies.
Figure 2:
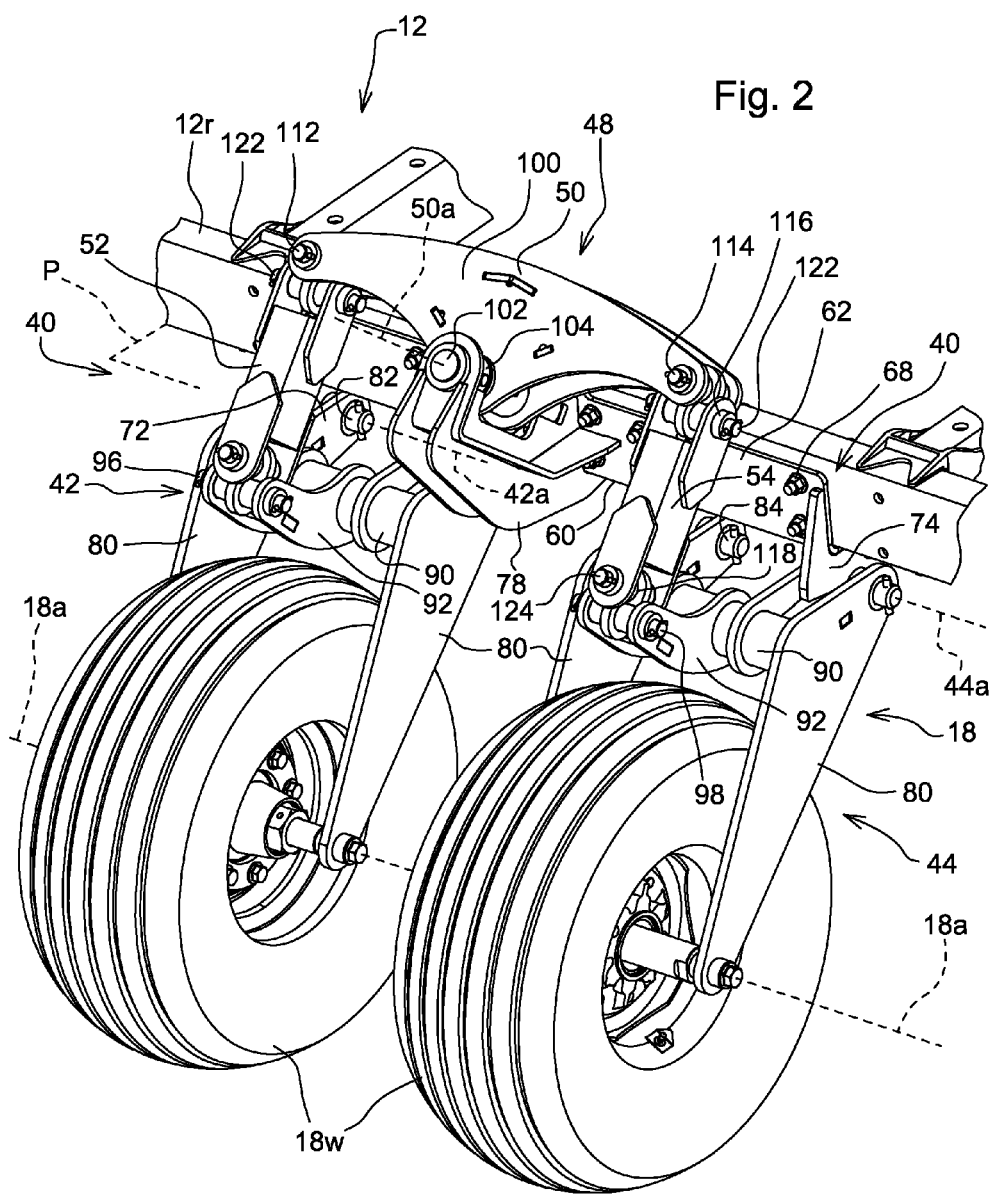
FIG. 2 is an enlarged rear perspective view of one of the pivotal support arrangements for a wheel assembly of FIG. 1.

Referring to FIG. 1, therein is shown a portion of an agricultural implement 10 having a main frame 12 supported for forward movement F over the ground by forward wheel assemblies 14 and 16 and aft wheel assemblies 18. The lowermost portions of the frame 12 lie generally along a horizontal plane P (FIG. 2). Earthworking tools 20 depend from the frame 12 and extend downwardly and rearwardly from central rockshaft structure 22 and from forward rockshaft structure 23 located ahead of the wheel assemblies 18.

As shown, the implement 10 is a high-speed nutrient applicator for applying chemicals such as anhydrous ammonia ($NH_3$) to the soil adjacent growing crops. The tools 20 each include a disk opener assembly 24 to open a slit in the soil and direct the chemical deep into the slit, and closing wheel structure 26 to seal the chemical within the slit. The implement 10 can operate in tall crops such as corn to sidedress $NH_3$, and therefore sufficient under-frame clearance is necessary to prevent damage to plants. Lift structure 30 rotates the rockshaft structures 22 and 23 about an axis transverse to the forward direction F to move the tools 20 downwardly into earthworking positions and to raise the tools from the ground for transport. The implement 10 includes folding wing sections 32, 34 and 36 which are movable upwardly and inwardly over a generally rectangular center section 12c of the main frame 12 to a transport position (not shown). In the transport position, the weight of the implement 10 is carried by the wheel assemblies 18, which are mounted to a transversely extending rear frame member 12r of the center section 12c and by a hitch 38 joined to, and projecting forwardly from, the center section 12c and being connected to a towing vehicle (not shown).

Referring to FIG. 2, the wheel assemblies 18 each include a wheel bracket structure 40 bolted or otherwise fixed to the rear frame member 12r and pivotally supporting leading or upper ends of downwardly and rearwardly inclined wheel arms 42 and 44 for rocking about respective wheel arm axes 42a and 44a. The wheel arms 42 and 44 have lower or trailing ends supporting first and second generally identical transversely spaced wheels 18w having rotational axes 18a. On level surfaces, the wheels 18w are side by side with the axes 18a generally coextensive. Linking structure 48 operably connects the wheel arms 42 and 44 for constraining the wheel arms to move generally in opposite vertical directions as the frame passes over the irregular surfaces to help equally distribute loads on the wheels 18w.

Figure 3:
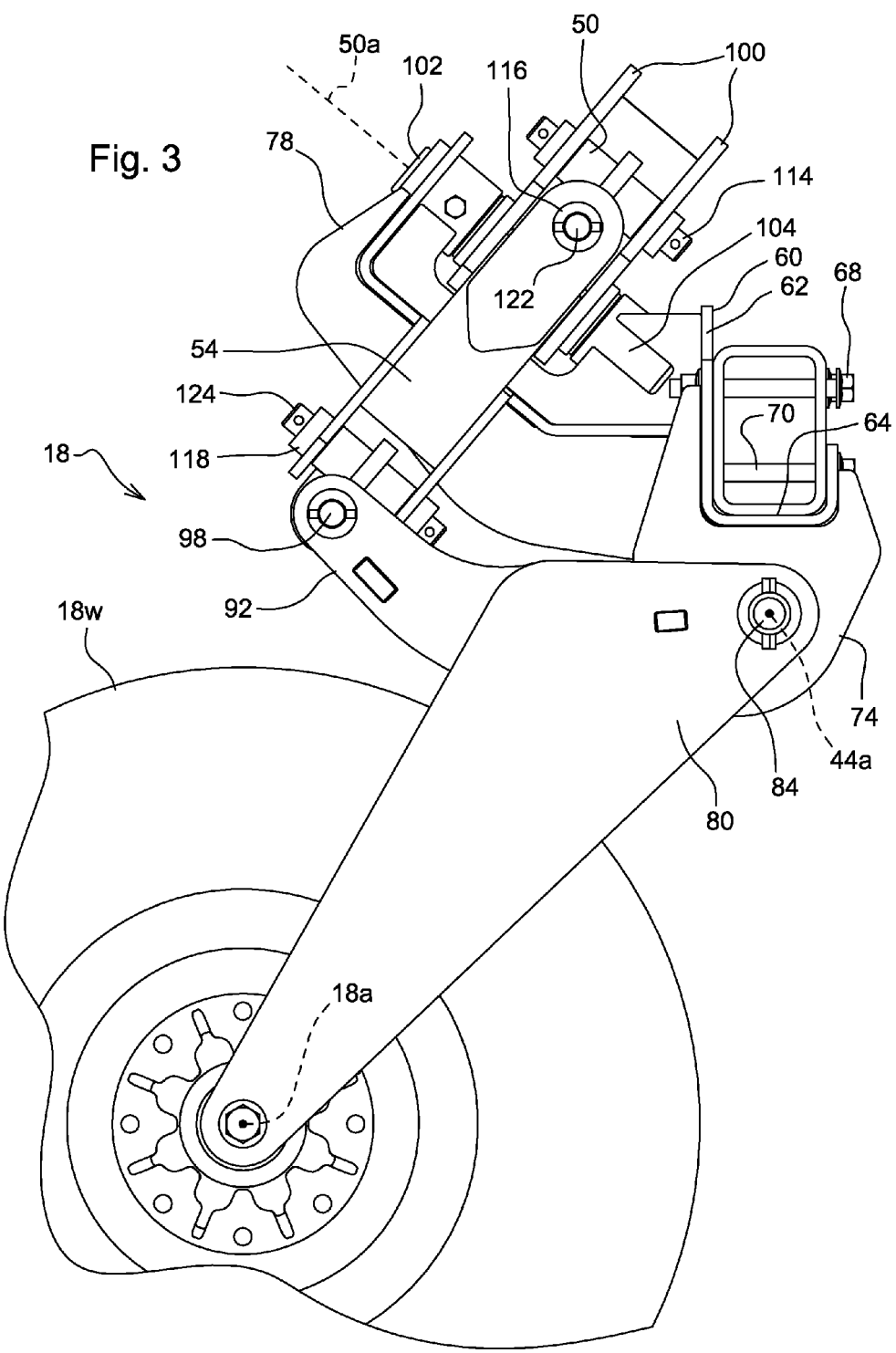
FIG. 3 is an enlarged side view the pivotal support arrangement of FIG. 2.

The linking structure 48 includes a transversely extending beam or connecting member 50 pivotally connected to the wheel bracket structure 40, which is fixed to the frame member 12r, for rocking about a fore-and-aft extending axis 50a having an upward extending component in the rearward direction (see FIG. 3). Opposite ends of the member 50 are connected by links or upright members 52 and 54 to the wheel arms 42 and 44, respectively, at locations on the wheel arms offset from the pivotal axes 42a and 44a so that as one of the wheels 18w moves downwardly over uneven terrain, the linking structure 48 constrains the opposite wheel 18w to move upwardly to evenly distribute loading between the two wheels 18w.

Figure 5:
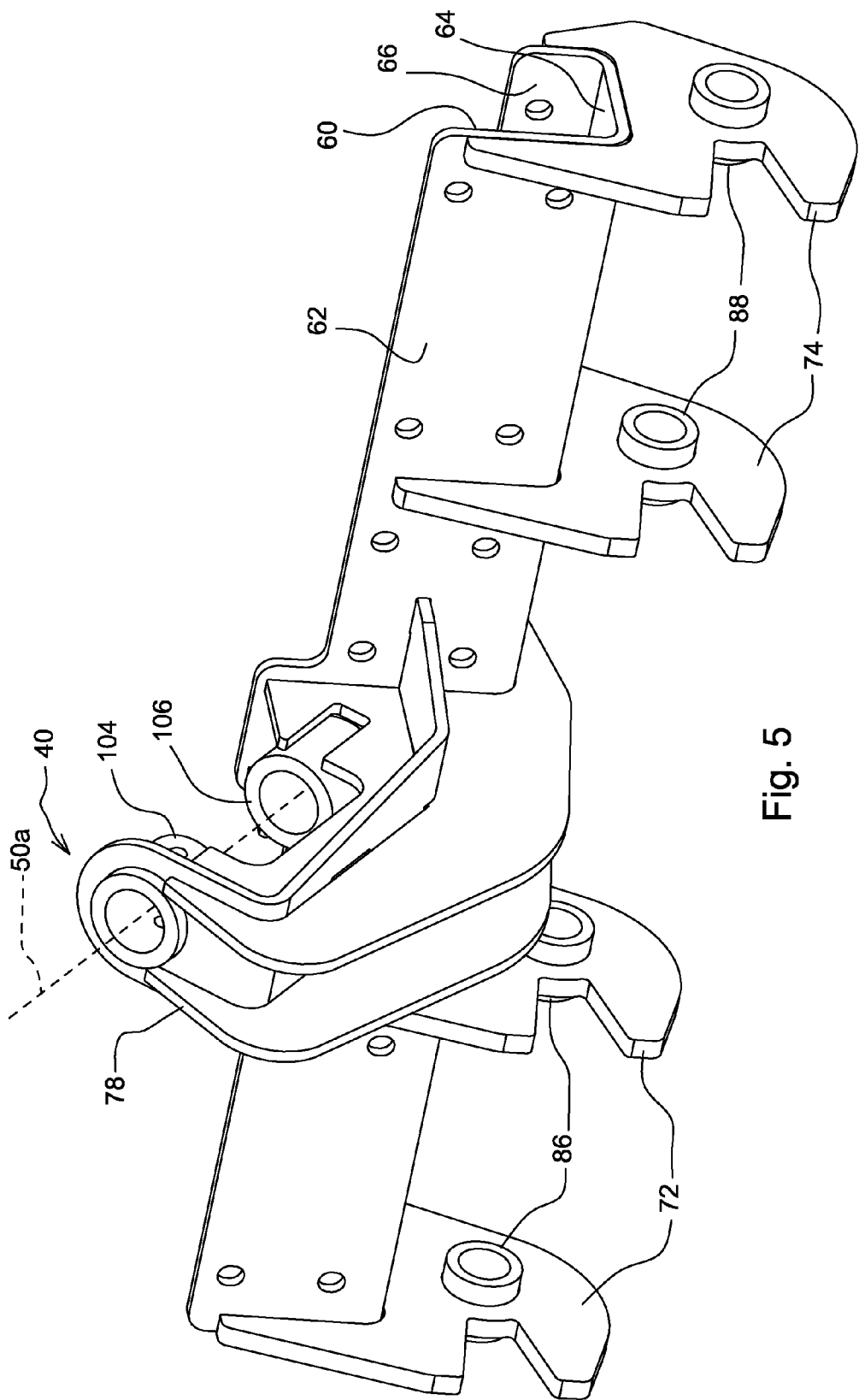
FIG. 5 is a rear perspective view of the bracket for the pivotal support arrangement of FIGS. 2 and 4.

The bracket structure 40 is shown as a single casting or weldment (FIG. 5) particularly constructed for being mounted to the rear frame member 12r, which is defined by a tubular member having a rectangular cross-section, and for this purpose includes a transversely extending portion 60 which is reverse J-shaped in cross-section (FIG. 3) and has an upright apertured rear wall or leg 62 positioned against a rear wall of the rear frame member 12r, a horizontally disposed leg 64 abutting a bottom of the rear frame member and extending forwardly to an apertured front leg or wall 66 that embraces a front wall of the rear frame member 12r. Upper bolts 68 (FIGS. 2 and 3) extend through the rear frame member 12r and apertures in the rear leg or wall 62. Lower bolts 70 extend through apertures in the front leg or wall 66, through the rear frame member 12r and through apertures in the rear leg or wall 62. The bolts 68 and 70 firmly secure the bracket structure 40 to the frame 12. Pivot brackets or wheel arm supports 72 and 74 depend from opposite ends of the bracket structure 40, and a beam pivot bracket 78 extends rearwardly and upwardly from the rear wall or leg 62 and the bottom wall or leg 64.

The wheel arms 42 and 44 are similar in construction and each includes a pair of spaced side plates 80 having upper forward ends connected by pivot pins 82 and 84 to bushings 86 and 88 centrally located on the pivot brackets 72 and 74 of the wheel bracket structure 40 at a location below the rear frame member 12r. The pair of side plates 80 of each of the arms 42 and 44 extend rearwardly from the pivot pin locations, are joined by a transversely extending connecting member 90 (FIG. 2) located behind the rear frame member 12r, are disposed on opposite sides of an associated one of the wheels 18w and have lower or trailing ends respectively coupled to opposite ends of the wheel axle. An extension arm 92 is fixed to the connecting member 90 in centered fore-and-aft alignment with the associated wheel 18w and extends upwardly and rearwardly from the connecting member 90 to a location spaced to the rear from an upper region of the plates 80 to an aft end pivotally connected to the lower portion of the corresponding upright link 52 or 54. Transversely extending pivot pins 96 and 98 respectively extend through the arms 92 and through the lower portions of the respective links 52 and 54.

The transversely extending beam or connecting member 50 includes first and second fore-and-aft spaced plates 100 pivotally connected to the frame 12 by a pin 102 extending through bushings 104 and 106 in the pivot bracket 78 and spaced from each other along the beam axis 50a. The upper ends of the upright links 52 and 54 extend between the plates 100 and are pivotally connected to the ends of the connecting member 50 by fore-and-aft extending pins 112 and 114. To provide necessary link freedom of motion as the member 50 pivots and as the wheels 18w pivot in opposite vertical directions about the respective arm pivotal axes 42a and 44a, additional pivotal connections are provided at link locations 116 and 118 by a transversely extending upper pivot pin 122 and a lower fore-and-aft extending pivot pin 124 to define universal joint connections between the opposite ends of the connecting member 50 and the respective wheel arms 42 and 44. The pivotal connections provide multiple degrees of freedom of movement between the wheel arms and the connecting member 50.

The above-described linking of the connecting member 50 to the wheel arms 42 and 44 provides some load transfer from the wheels 18w to the frame 12 at a location rearwardly of the wheel arm pivotal axes 42a and 44a to reduce wheel arm pivot loads. The pivotal axis 50a of the pin 102 is approximately perpendicular to a plane passing through the wheel axes 18a and the wheel arm pivotal axes 42a and 44a when the wheels 18w are side-by-side on a level surface.

Figure 4:
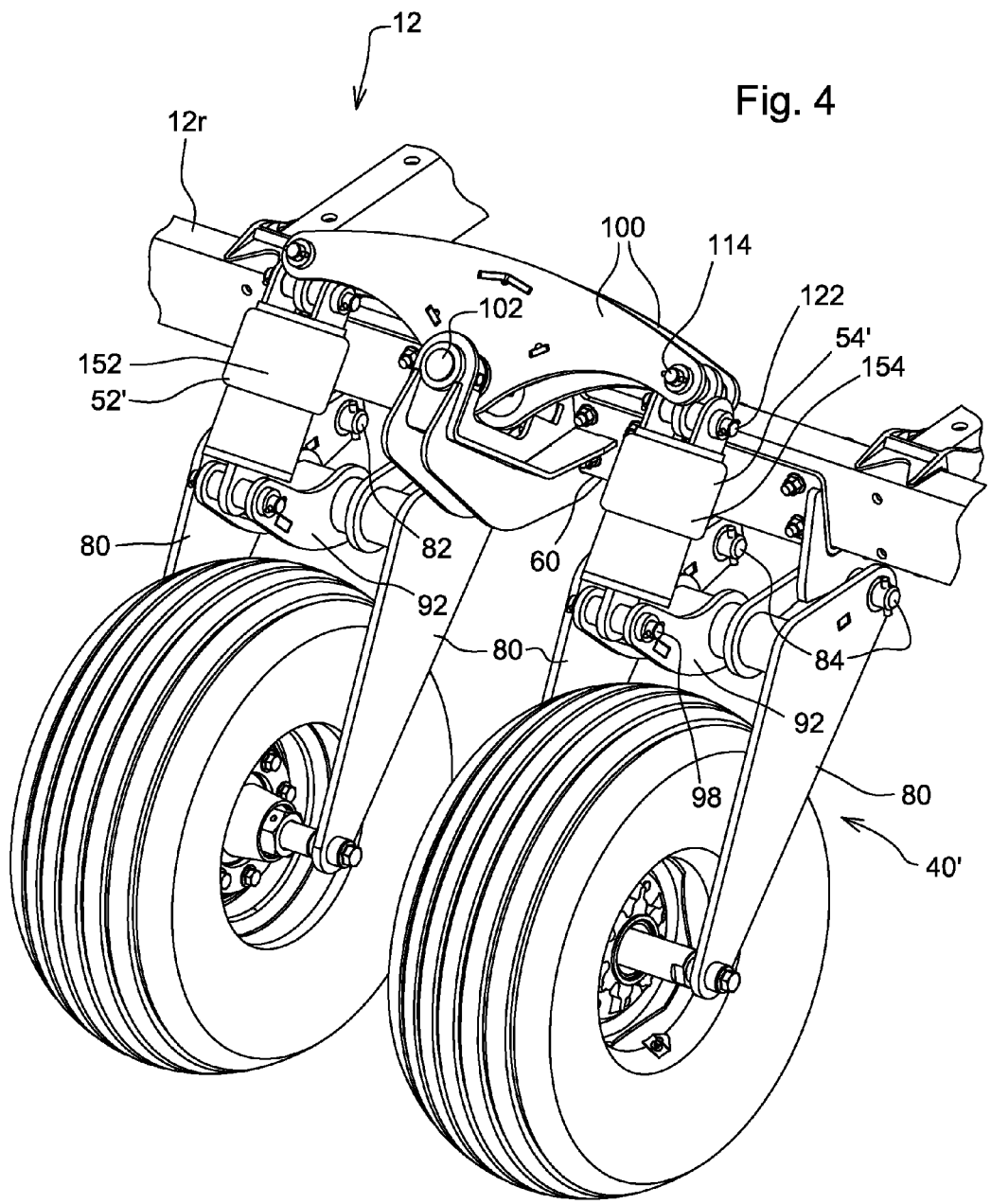
FIG. 4 is a view similar to FIG. 2 but showing an alternate embodiment of a pivotal support arrangement having cushioning structure.

In the embodiment shown in FIG. 4, links 52' and 54' include cushioning members 152 and 154. As shown, the cushioning members 152 and 154 are elastomeric blocks which absorb shock impacts and reduce loading on the wheel bracket structure 40', although other cushioning or resilient members such as springs, air bags, hydraulic cylinders or accumulation devices could also be used. A single cushioning member could also be used instead of two or more members.

Having described the preferred embodiment, it will become apparent that various modifications can be made without departing from the scope of the invention as defined in the accompanying claims.

The invention claimed is:

1. An implement including a frame and wheel assemblies supporting the frame for movement in a forward direction over level ground and over irregular ground surfaces, the implement comprising:

said frame including a transversely extending rear frame member;

said wheel assemblies including at least one wheel assembly having a wheel bracket structure mounted to said rear frame member;

first and second downwardly and rearwardly inclined wheel arms being spaced transversely from each other and each having upper and lower ends and being connected at the upper end to the wheel bracket structure for rocking in an upright plane about an arm axis extending generally transverse to the forward direction;

first and second ground engaging wheels respectively connected to the lower ends of the first and second wheel arms at transversely offset locations relative to each other and being centered within the respective upright planes in which the wheel arms rock;

a transverse beam connected to the wheel bracket structure for rocking about a beam axis disposed generally transverse to the arm axes, the transverse beam having first and second ends; and first and second upright members respectively operably connecting the first and second ends of said transverse beam to the first and second wheel arms for constraining the wheel arms to move generally in opposite vertical directions as one or the other of said first and second ground engaging wheels pass over the irregular ground surfaces to maintain a generally uniform load on the first and second ground engaging wheels.

2. The implement as set forth in claim 1 wherein said wheel bracket structure includes a pivot bracket positioned upwardly and rearwardly from said frame and supporting the transverse beam with the beam axis extending upwardly in a rearward direction from the frame, the transverse beam being located above a bottom portion of the frame to facilitate crop flow under the frame.

3. The implement as set forth in claim 1 wherein the beam axis is centrally located relative to the first and second ends of the transverse beam and the wheel arms.

4. The implement as set forth in claim 1 wherein each of the upright members operably connecting the first and second ends of said transverse beam to the first and second wheel arms comprises at least one spring member.

5. The implement as set forth in claim 1 wherein the transverse beam is offset above and rearward from the arm axes of the wheel arms.

6. The implement as set forth in claim 5 wherein the first and second upright members, respectively operably connecting the first and second ends of said transverse beam to the first and second wheel arms respectively comprise first and second spring members connected between the first and second ends of said transverse beam and the first and second wheel arms.

7. The implement as set forth in claim 6 wherein the first and second spring members respectively comprise first and second cushion blocks fabricated from resilient material.

8. The implement as set forth in claim 1 wherein the first and second ground engaging wheels respectively include first and second axles generally aligned with each other in the transverse direction when the implement frame moves over the level ground.

9. The implement as set forth in claim 1 wherein the arm axis of each of the first and second wheel arms is located vertically below the rear frame member.

10. The implement as set forth in claim 9 wherein the transverse beam and the connection defining the beam axis are located above a plane defined by lowermost portions of the frame to reduce crop and soil flow impedance under the frame.

11. An implement having a frame supported by wheel assemblies for movement in a forward direction over level and irregular ground surfaces, the implement comprising:
    said frame including a transversely extending rear frame member, which is rectangular in cross-section;
    said wheel assemblies including at least one wheel assembly including a wheel bracket structure mounted to said rear frame member;
    first and second wheel arms being spaced transversely from each other and inclined downwardly and rearwardly from said rear frame member, said wheel arms each having leading and trailing ends and each being connected at the leading end to the wheel bracket structure for rocking vertically about an arm axis extending generally transverse to the forward direction;
    first and second ground engaging wheels respectively connected side-by-side to the trailing ends of the first and second wheel arms;
    a transverse beam connected to the wheel support bracket for rocking about a beam axis disposed generally transverse to the arm axes, the transverse beam having transversely spaced first and second ends; and
    first and second link structures respectively operably connecting the first and second ends of said transverse beam to the first and second wheel arms for constraining the wheel arms to move in opposite vertical directions as the frame passes over the irregular surfaces to distribute loading on the first and second ground engaging wheels.

12. The implement as set forth in claim 11 wherein the first and second ground engaging wheels respectively include first and second wheel axles generally aligned with each other in the transverse direction when the implement frame is moving over the level surfaces.

13. The implement as set forth in claim 11 wherein said first and second link structures respectively include first and second upright members having respective upper ends, respectively pivotally connected to the first and second ends of the transverse beam and respective lower ends respectively pivotally connected to the first and second wheel arms.

14. The implement as set forth in claim 11 wherein the transverse beam is located above a bottom portion of the implement frame to optimize clearance above the ground surface and below the frame.

15. The implement as set forth in claim 11 including first and second pivotal connections each having a transversely extending pivotal axis and a fore-and-aft extending pivotal axis, the first pivotal connection connecting the first link structure to the first end of said transverse beam and to the first wheel arm, and the second pivotal connection connecting the second link structure to the second end of said transverse beam and to the second wheel arm, thereby providing multiple degrees of freedom of movement between the wheel arms and the transverse beam.

16. The implement as set forth in claim 11 wherein each of said first and second link structures includes a cushioning member.

17. The implement as set forth in claim 11 wherein said first and second wheel arms respectively include first and second extension arms extending rearwardly at respective upper regions of the wheel arms, and wherein the first and second link structures are respectively connected to aft ends of the first and second extension arms.

18. The implement as set forth in claim 11 wherein said wheel bracket structure is a unitary bracket structure including a transversely extending attaching portion having a reverse J cross-section engaged with and secured to rear, bottom and front sides of the rear frame member, the wheel bracket structure further including wheel arm supports, with the wheel arms being pivotally coupled to said wheel arm supports and defining the wheel arm axes.

19. The implement as set forth in claim 18 wherein the wheel bracket structure further includes a beam pivot bracket extending upwardly and rearwardly from said attaching portion and having front and rear bushings spaced from each other along said beam axis and receiving a pivot pin extending through said transverse beam, thereby defining the beam axis.

* * * * *